United States Patent [19]
Gornowitz

[11] 3,802,082
[45] Apr. 9, 1974

[54] DEVICE FOR MEASURING THE DISPLACEMENT OF A CARRIAGE ALONG A BAR

[75] Inventor: Kurt Gornowitz, Lahr/Schwarzwald, Germany

[73] Assignee: Albert Nestler GmbH, Lahr/Schwarzwald, Germany

[22] Filed: June 9, 1971

[21] Appl. No.: 151,417

[30] Foreign Application Priority Data
June 11, 1970 Germany.......................... 2028687

[52] U.S. Cl.............................. 33/1 M, 33/141 R
[51] Int. Cl. ............................................. G01b 3/12
[58] Field of Search............. 33/1 M, 125 M, 141 R

[56] References Cited
UNITED STATES PATENTS
| | | | |
|---|---|---|---|
| 3,438,133 | 4/1969 | Brault | 33/1 M |
| 3,209,996 | 10/1965 | Carson et al. | 33/1 M |
| 3,166,846 | 1/1965 | Pascoe et al. | 33/1 M |
| 1,718,052 | 6/1929 | Lineaweaver | 33/141 R |

FOREIGN PATENTS OR APPLICATIONS
| | | | |
|---|---|---|---|
| 523,704 | 11/1953 | Belgium | 33/125 M |
| 9,302 | 5/1899 | Great Britain | 33/141 R |

Primary Examiner—Robert B. Hull

[57] ABSTRACT

A device particularly for use with a drafting machine having a carriage for movement along a rack attached to a bar. The device includes a housing, pinion means rotatably coupled to the housing and axle means pivotally mounting the housing on the associated carriage. The pinion means is biased resiliently into meshing engagement with the rack and disc means is provided having a circular scale means for indicating displacement of the carriage along the rack selectively in either metric or inch units. Two pinions engageable with the rack are selectively operative as the drive means controlling the rotation of the scale appropriate to the desired units.

7 Claims, 10 Drawing Figures

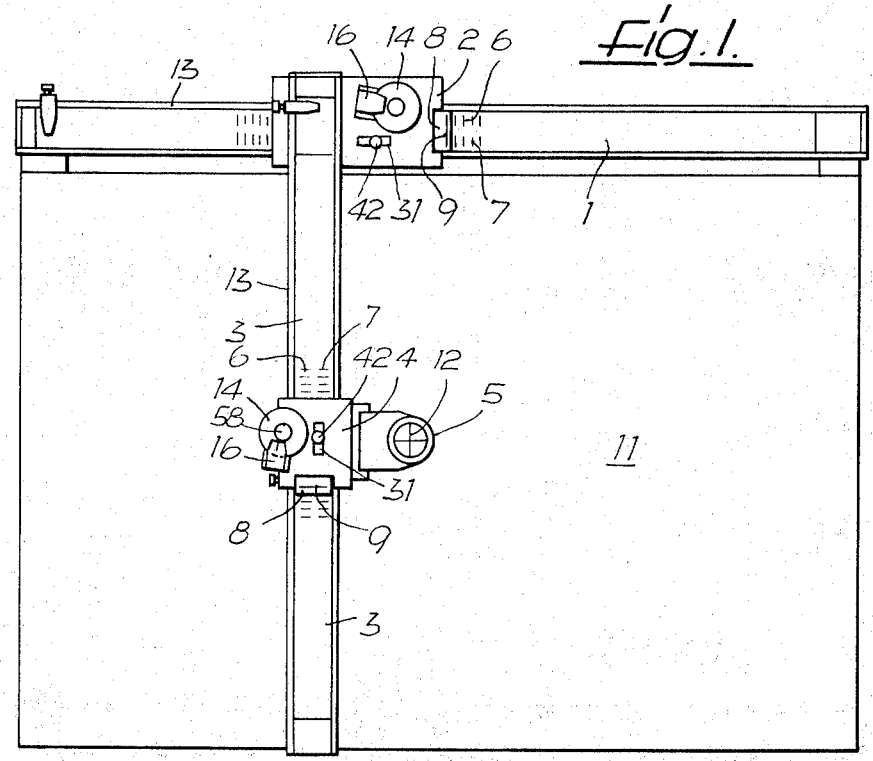
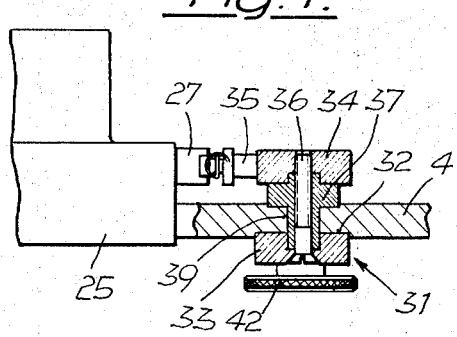
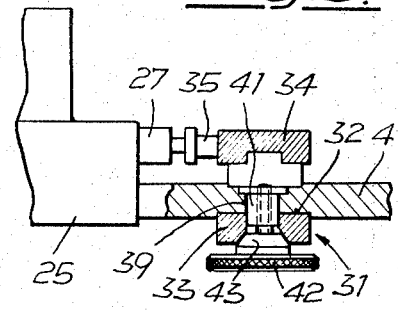

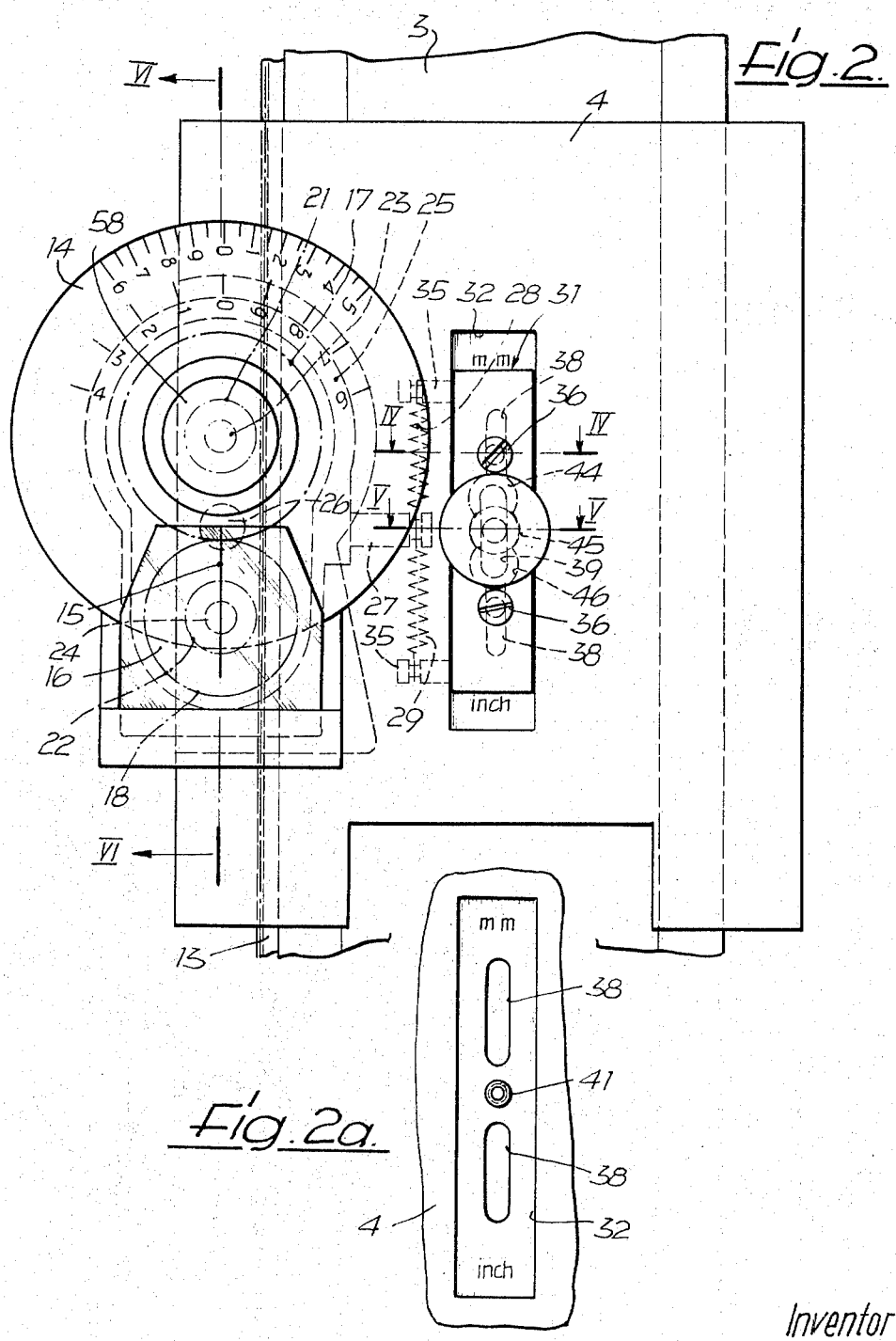

Inventor:
KURT GORNOWITZ
BY Bacon & Thomas

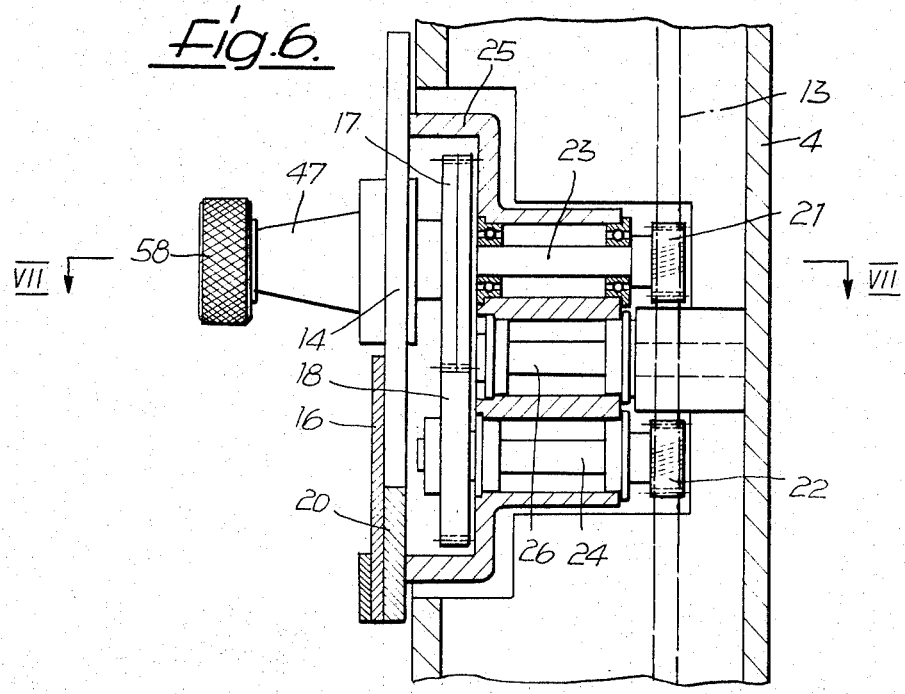

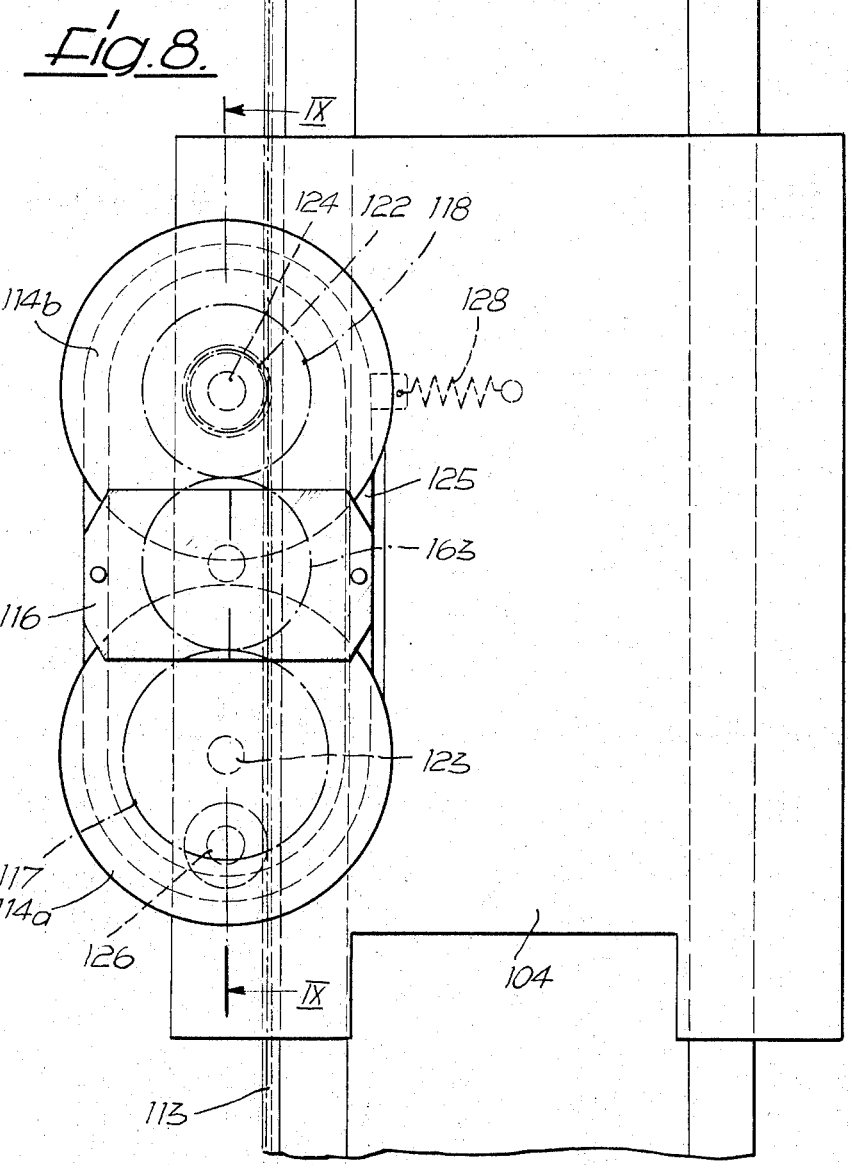

DEVICE FOR MEASURING THE DISPLACEMENT OF A CARRIAGE ALONG A BAR

This invention relates to a device for measuring the displacement of a carriage along a bar.

In cartography, engineering drawing and other fields, it is not uncommon to draw in relation to a zero co-ordinate. This is particularly true in surveying work where measurements are made in relation to a particular location and then these measurements are used to draw a map. Machines commonly called coordinatographs are available which consist of a pair of bars at right angles, one of the bars being attached to the edge of a drawing board and the other bar being attached to a carriage running on the first bar. A second carriage is mounted on the second bar and scales on the bars indicate the position of a marking instrument mounted on the second carriage. By setting the scales to zero in relation to a particular position on the board, the carriages can be moved to another position, each of the carriages moving in response to one of the co-ordinates of the new point.

While co-ordinatographs are well known, they have scales for either metric or inch units of measurement. To convert a co-ordinatograph from one unit to the other requires the removal of scales, measuring heads and the like and their replacement in the other units. This is a relatively time consuming operation and is most undesirable. However, with the advent of the use of both scales of measurement, there is an increasing need for co-ordinatographs capable of measuring in either metric or inch units.

It is an object of the present invention to provide a device for measuring the displacement of a carriage along a bar, the device being suitable for use in two systems of length units.

The invention will be better understood with reference to the drawings, wherein:

FIG. 1 is a view looking down on a drawing board of the co-ordinatograph type and incorporating devices according to the invention;

FIG. 2 is a view similar to FIG. 1 showing a carriage in more detail, the carriage incorporating the device according to the invention;

FIG. 2a is a view showing a part of FIG. 2 in more detail;

FIG. 4 is a sectional end view on lines IV—IV of FIG. 2;

FIG. 5 is a view similar to FIG. 4 on lines V—V of FIG. 2;

FIG. 6 is a sectional side view on lines VI—VI of FIG. 2;

FIG. 7 is a sectional end view on lines VII—VII of FIG. 6;

FIG. 8 is a view similar to FIG. 1 of an alternative embodiment of the device;

Figure 3:
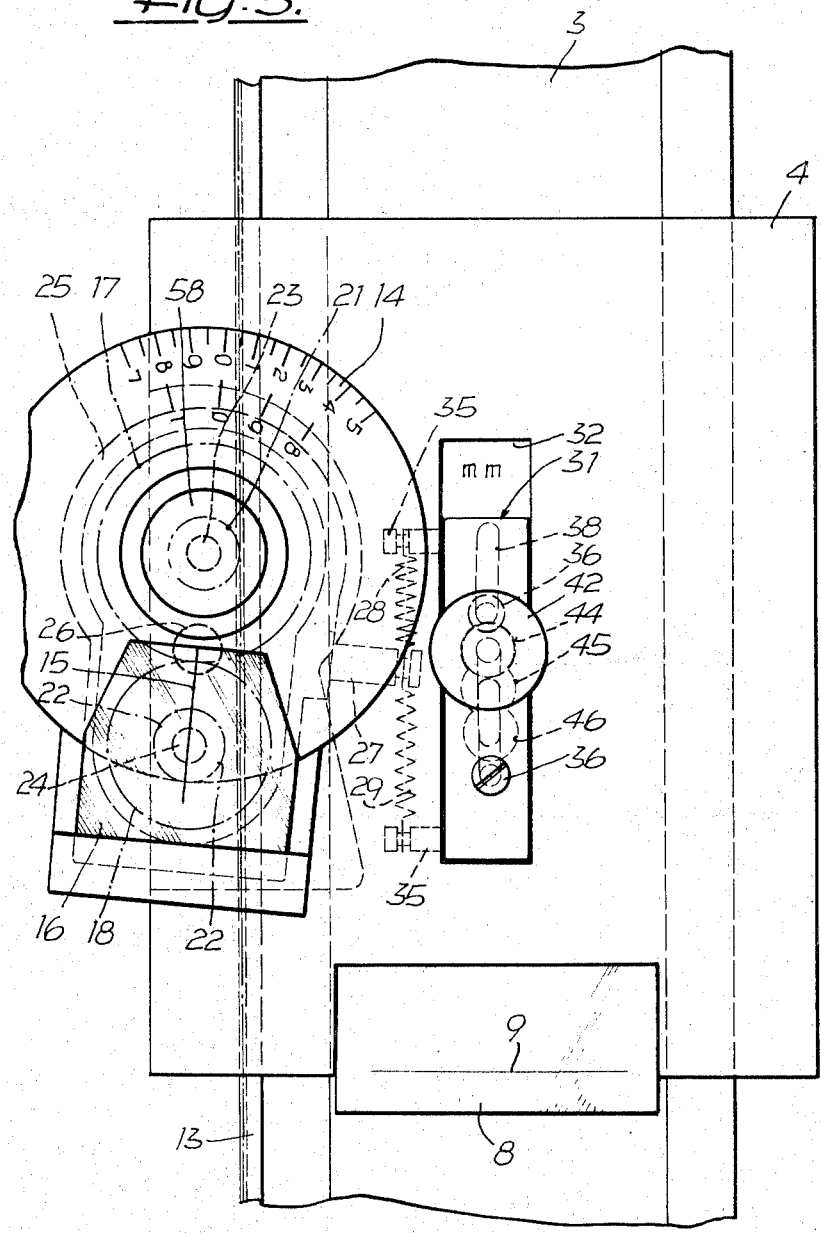
FIG. 3 is a view similar to FIG. 2 showing the device in another position.

Reference is first made to FIG. 1 which shows a drawing board in the form of a co-ordinatograph and incorporating a device according to the invention. The device includes a first bar 1 along which a first carriage 2 is free to move. The first carriage 2 is rigidly attached to a second bar 3 extending at right angles to the first bar 1 and along which a second carriage 4 is free to move. A measuring head 5 or other similar attachment such as a drafting head is coupled to the carriage 4.

Carriages 2 and 4 are guided along bars 1 and 3 by roller wheels or any other conventional means not shown in the drawing. Each of the bars 1 and 3 is equipped with two scales 6 and 7 respectively for metric and inch systems of measurement. Transparent plastic plates 8 are provided on the carriages for reading the scales 6 and 7 and a reference line 9 is provided on the underside of the plastic plate.

The bar 1 is attached to the top edge of a drawing board 11 so that the scales 6 and 7 on the bars 1 and 3 indicate co-ordinates of points on the board 11. Cross threads 12 in the head 5 aid in locating the carriages at positions corresponding to a point on the board 11. Co-ordinates of that point can then be read off scales 6 and 7 on the bars 1 and 3.

For the purpose of more accurate location of points on the board, the bars 1 and 3 each carry a rack 13 engaging with pinions to be described in greater detail hereinafter. The pinions are rotatably mounted on respective carriages 2 and 4 and coupled to respective measuring discs 14 for locating the position of the carriage relative to an arbitrary zero co-ordinate. The discs 14 are provided with divisions which can be read off using a reference line 15 on the underside of a transparent plate 16.

The bars 1 and 3 and the carriages 2 and 4 are similar in construction, although the carriage 2 is lengthened to provide attachment of the bar 3 to the carriage 4. Carriage 4 will therefore be described as exemplary of both carriages.

Reference is next made to FIGS. 2 and 3 which show the disc 14 and plate 16 in more detail. The reference line 15 can be seen in relation to the disc which is coupled to a gear 17 in mesh with a gear 18; the gears 17 and 18 have 127 and 100 teeth respectively. Gears 17, 18 are rigidly coupled to shafts 23, 24 on which are also mounted respective pinions 21, 22. The pinions are similar in diameter and have 20 teeth at 2 millimeter pitch. This pitch corresponds to that of the rack 13.

The gears 17, 18 and the pinions 21, 22 are rotatably mounted by means of shafts 23, 24 in a housing or rocker 25 open at the top. An axle 26 is provided and located parallel to shafts 23, 24 and centrally between the shafts. The housing 25 is rotatably mounted on the axle 26 so that the housing can be moved to bring one of the pinions 21, 22 selectively into engagement with the rack 13. The top opening in housing 25 is closed off by the measuring disc 14 and a cover 20 on which the plate 16 is mounted. The plate 16 covers part of the disc 14 and can be hinged and spring loaded to permit removal and replacement of the disc 14 as will be described.

A lever 27 extends from the housing 25 transversely of the axle 26 and is attached to ends of co-axial springs 28, 29 which are equally extended when the lever 27 is in its mid position. A slide 31 is slidably mounted in a recess 32 on carriage 4 such that the travel of slide 31 is longer than the path travelled by the point of lever 27 which is connected to the springs 28, 29. As a result, when slide 31 is moved to one of its end positions, one of the pinions 21 or 22 is held resiliently in engagement with rack 13 by the difference in tension of the springs 28, 29. The inscriptions "mm" and "inch" appear in the bottom of recess 32 adjacent respective ends of the recess so that when the slide 31 is in one of its end positions, one of the inscriptions show, and when the slide is moved to the other of its end positions the other inscription shows. As a result there is a visual indication of which measuring system is in use.

Reference is next made to FIGS. 2a, 4 and 5 to more fully describe the slide 31 and associated parts. The slide has an upper part 33 guided in recess 32 of carriage 4, and a lower part 34 carrying two pins 35 for the attachment of springs 28, 29. The parts 33, 34 are coupled together by two screws 36 and are held apart by spacer bushes 37 engaging in respective elongated openings 38 in carriage 4. Upper slide part 33 has a central elongated opening 39 accommodating a threaded bolt 41 attached to carriage 4 centrally between the two elongated openings 38. A knurled nut 42 is engaged on the bolt 41 and has a conical extension 43 facing the upper slide part 33. The top surface of slide part 33 is provided with three conical recesses 44, 45 and 46 each of which terminates in the elongated opening 39. As a result, when the knurled nut 42 is tightened, the conical extension 43 enters one of the recesses, 44, 45 or 46 depending upon where the slide 31 is to be locked, the recess 44 corresponding to metric sizes, the recess 45 being in neutral position and the recess 46 corresponding to inch sizes.

In the position shown in FIG. 2 the pinions 21, 22 are disengaged from the rack 13 because the knurled nut 42 is tightened in the neutral position. If it is desired to measure in inches, the nut is retracted and the slide 31 is pushed upwardly to expose the "inch" sign and hide the "mm" sign. The housing 25 then rotates in an anti-clockwise direction (as shown in FIG. 2) about axle 26 to bring pinion 22 into engagement with the rack 13. Conversely, if it is desired to measure in metric units, the slide is moved downwardly to hide the "inch" sign and the nut is then locked in the conical recess 46 so that the pinion 21 is engaged in the rack 13. This position is shown in FIG. 3.

Reference is next made to FIGS. 6 and 7. The shaft 23 projects outwardly from housing 25 and the measuring disc is coupled to the end of the shaft. A housing 47 having external flange 48 extends outwardly from the disc 14 and a flanged bush 51 locates the disc 14 in relation to the housing 47. Screws are provided passing outwardly from the flanged bush 51 through the disc 14 and threaded into the flange 48 to lock the assembly together. The interior of housing 47 has a conical surface 52 converging outwardly and against which a slotted collet 53 engages. The collet includes a threaded portion 54 extending outwardly and to which is screwed a flanged bush 55 having an external flange 56 resting against an internal shoulder 57 of housing 47. The bush 55 projects outwardly of housing 47 where it is rigidly attached to a knob 58. An outer end 59 of the shaft 23 is slightly tapered for engaging in bore 61 of collet 53. A screw 62 is provided for engaging relatively loosely in one of the collet slots 53 to prevent rotation of the collet relative to the housing 47.

In use, the disc 14 together with the associated parts shown in FIG. 7 is engaged on the shaft 23 with the end 59 projecting into the collet 53. The user then holds the disc 14 and rotates the knob 58 in a clockwise direction to draw the collet 53 into tighter engagement with the conical surface 52. As a result, the collet tightens about the end 59 so that the disc 14 and associated parts will move in unison with shaft 23. Once in place, the plate 16 is positioned over the disc for reading the scales on the disc.

The gears 17 and 18 are chosen to have respectively 127 and 100 teeth. As a result, one revolution of the gear 17 results from 1.27 revolutions of the gear 18 and therefore of the pinion 22. For read-out in the British system, the pinion 22 will be engaged. Because the pinion 22 has 20 teeth at 2 millimeter pitch, then one revolution of the gear 17 results from the carriage moving along the rack 13 a distance 1.27 × 40 millimeters equals 50.8 millimeters. However, one inch equals 25.4 millimeters (to a close approximation) so that one revolution of the disc is substantially equivalent to a movement of two inches. The scale on the disc is therefore graduated such that a movement of 180° of the disc corresponds to a one inch movement of the carriage along the rack 13.

If the metric system is used, the pinion 21 is in engagement with the rack 13 and because the pinion 21 also has 20 teeth at 2 millimeters pitch, one revolution of the disc 14 is equivalent to 40 millimeters. As a result, the disc is graduated such that a 90° movement of the disc corresponds to 10 millimeters or one centimeter.

While the gears described have been chosen because they provide a particularly compact and efficient unit, they can nevertheless be changed if required. For instance, if the pinion 22 were changed for a 40 tooth pinion at 2 millimeters pitch, then one revolution of the disc 14 would be equivalent to a movement of 4 inches along the rack 13. As a result, the disc would then be divided at 90° intervals in inches. Various modifications to the gears are therefore possible within the concept of the invention.

Figure 9:
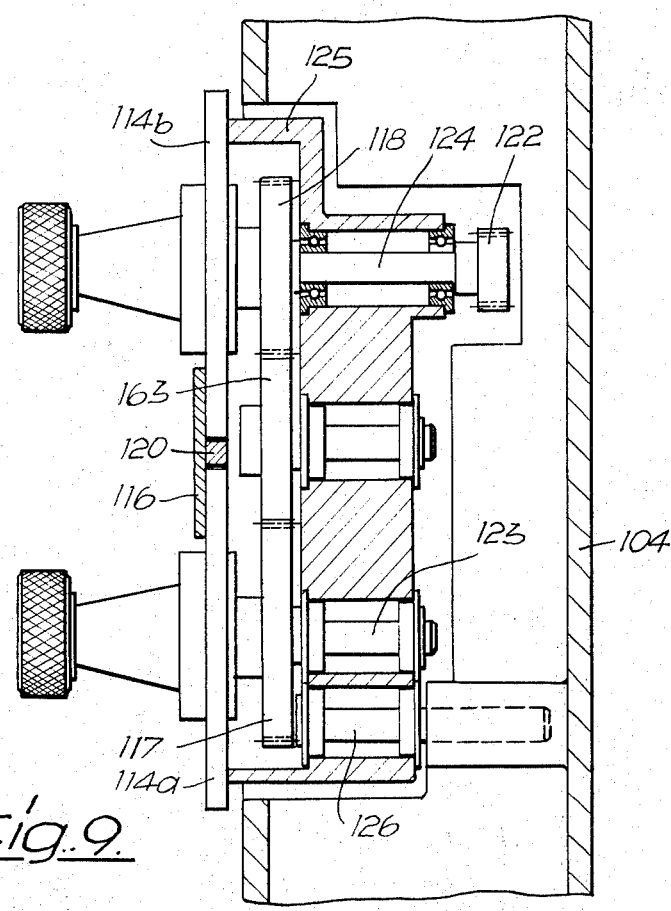
FIG. 9 is a sectional side view on lines IX—IX of FIG. 8.

Reference is next made to FIGS. 8 and 9 which show an alternative embodiment of the device according to the invention. Parts shown in FIGS. 8 and 9 which correspond to parts previously described have their reference numerals increased by 100 over those previously described to facilitate reference to the previously described embodiment.

The device shown in FIGS. 8 and 9 differs from the previously described device mainly in that the gears 117, 118 do not mesh directly together. The gears are coupled through an intermediate gear 163 having 100 teeth. Also, the housing 125 is pivotally mounted at one end to an axle 126. In this way, a single tension spring 128 is sufficient to keep a pinion 122 in constant resilient engagement with rack 113. In this case, two measuring discs are used, firstly measuring disc 114a which is driven through gears 117, 163 and 118 coupled to pinion 122, and disc 114b which is driven directly from pinion 122. The discs 114a and 114b and their associate parts are similar to those described with reference to FIGS. 6 and 7.

One complete revolution of the pinion 122 which has 20 teeth on a 2 millimeter pitch again corresponds to a 40 millimeter movement of the carriage 104. The disc 114b is therefore provided with divisions according to the metric system such that a 90° movement of the disc 114b corresponds to a 1 centimeter movement of the carriage. As the disc 114b is rotating, the gears 118, 163 and 117 cause the disc 114a to rotate in the same direction as the disc 114b. The effect of the gears is to drive the disc 114a at a speed less than the disc 114b by a factor of 100 divided by 127. As a result, one revolution of the disc 114a corresponds to a movement of two inches along rack 113. This embodiment has the advantage that there is no need to change from inches to metric, because the pinion 122 is in permanent engagement with the rack 113 and the user simply decides which of the two discs he wishes to use. As a matter of convenience, blank discs can be provided to replace one of the discs not in use to ensure that the wrong scale is not read.

Similarly, if preferred, the user can use a disc similar to that described with reference to FIG. 2 and position it either on shaft 124 or on shaft 123 depending upon which system of measurement he is using. He can then either add a blank disc to the other shaft or simply leave it exposed.

What we claim is:

1. A co-ordinatograph comprising: first and second bars disposed substantially at right angles one with the other; a first carriage movably mounted on the first bar for displacement along the first bar, the second bar being rigidly attached to the first carriage; a second carriage movably mounted on the second bar for movement longitudinally of the second bar; a rack attached to one of said bars and extending longitudinally of the bar; and a measuring device coupled to the one of said carriages mounted on said one of said bars, the measuring device comprising: a housing; first and second pinions rotatably coupled to said housing; axle means pivotally mounting said housing on said one of said carriages for selectively engaging and disengaging said pinions with said rack such that when one of the pinions is selectively engaged with the rack, the other of the pinions is disengaged; means resiliently biasing the pinions such that said selected one of the pinions is biased into meshing engagement with said rack; disc means having circular scale means for indicating displacement of said one of said carriages along said rack in a selected one of two different length units; first and second coupling means for coupling said pinions to said disc means whereby rotation of said pinions results in rotation of said disc means so that displacement of said one of said carriages along said one of said bars is indicated at said disc means in one of said two different length units depending on which of said pinions is in selective engagement with said rack.

2. A co-ordinatograph as claimed in claim 1 in which said coupling means comprises first and second shafts fastened to respective said first and second pinions and first and second gears being fastened to respective said first and second shaft and in mesh, the number of teeth on said first gear being to the number of teeth on said second gear as 1.27 is to 1, so that for a predetermined movement of said one of said carriages along said one of said bars, the disc will make 1.27 revolutions when said first pinion is engaged with said rack for every revolution the disc will make when said second pinion is engaged with said rack, said disc means comprising a disc and means releasably attaching the disc to said first shaft.

3. A co-ordinatograph as claimed in claim 2 in which each of said pinions has 20 teeth at 2 millimeter pitch, said first gear has 127 teeth, and said second gear has 100 teeth, and wherein said disc has at least one scale such that one revolution of the disc corresponds to 4 centimeters travel along said rack when said first pinion is engaged with the rack and to 2 inches travel along said rack when said second pinion is engaged with the rack.

4. A device for measuring movement along a bar, the device comprising:
a rack attached to the bar and extending longitudinally of the bar;
carriage means mounted on the bar for longitudinal movement thereof, said carriage means including at least one measuring disc rotatably mounted for indicating the position of the carriage on the bar, and two selectively useable gear means coupling said disc to said rack for driving said disc to indicate displacement measured in one of two different systems of length units, said gear means comprising a pair of gears in mesh, and a pair of pinions, each of the gears being coaxial with and coupled to a respective one of the pinions, means for selectively engaging said pinions with said rack comprising a rocker rotatably supporting the gears and pinions and arranged for pivotal movement between two positions, whereby in one of the positions, one of the pinions is engaged with the rack for driving an associated one of the gears, and in the other of the positions the other pinion is engaged with the rack for driving the other one of the gears, the disc indicating a first unit of length measurement when driven by the first pinion and a second unit of length measurement when driven by the second pinion.

5. A device as claimed in claim 4 in which the rocker is in the form of a housing enclosing the gears and the pinions, the measuring disc being rotatably mounted on the outside of the housing.

6. A device as claimed in claim 4, in which said selective engaging means further comprises: a lever mounted on said rocker; a slide; a pair of elongated coil springs coupling said slide to said lever, the springs being coupled to said lever at their inner ends and extending in opposite directions from the lever, the springs being coupled at their outer ends to the slide, the path of travel of the slide being longer than the pivoting path of the lever at its point of connection with the springs, and means adapted to lock the slide at the ends of its path of travel and at a point substantially mid-way between said ends of said path of travel.

7. A device as claimed in claim 6 characterized in that when the slide is at said mid-way point, said springs are stressed substantially equally.

* * * * *